United States Patent [19]
Norris

[11] Patent Number: 5,313,663
[45] Date of Patent: May 17, 1994

[54] EAR MOUNTED RF RECEIVER

[75] Inventor: Elwood G. Norris, Poway, Calif.

[73] Assignee: American Technology Corporation, Poway, Calif.

[21] Appl. No.: 879,929

[22] Filed: May 8, 1992

[51] Int. Cl.$^5$ .............................................. H04B 1/08
[52] U.S. Cl. ................... 455/351; 455/347; 455/350
[58] Field of Search ................... 455/347–352, 455/343, 161.1; 381/187, 188, 25, 68.6, 183; 379/430, 433, 447; 361/422

[56] References Cited

U.S. PATENT DOCUMENTS 4,539,708 9/1985 Norris ................... 455/351

FOREIGN PATENT DOCUMENTS 403034732 2/1991 Japan ................... 455/348

Primary Examiner—Reinhard J. Eisenzopf
Assistant Examiner—Thanh C. Le
Attorney, Agent, or Firm—Thorpe, North & Western

[57] ABSTRACT

A radio frequency receiving device which is totally self contained and is fully supported at a diverging opening of a user's ear extending from the ear canal. The device includes an elongate casement having a lower portion and an upper portion at a total length of less than two inches. The casement is constructed of a top portion and a bottom portion, the top portion being deflected from the bottom portion by an acute angle whose value is between the range of 10 to 30 degrees. The bottom portion includes a speaker device mounted at a proximal side thereof and being configured to frictionally fit at the diverging ear opening in close proximity to the skull, with the upper half resting against the ear or being in frictional contact with an upper lip of the ear extending from the top cartilage. The device includes a printed circuit board contained within the casement, a battery compartment, on/off power and volume switches and a tuning circuit for providing selection of desired frequency. The total structure is housed within the casement and weighs less than 2.5 ounces.

18 Claims, 2 Drawing Sheets

EAR MOUNTED RF RECEIVER

BACKGROUND OF THE INVENTION

1. Field of the Invention

This invention relates to radio frequency (rf) receivers which can be positioned in the ear of a user. More particularly, it pertains to an ear mounted radio which is totally self-contained and requires no additional structural support to maintain its fixed, ear mounted position.

2. Prior Art

Since early conception of small sized radios, various innovations have been made to place such radios at the ear of the user. Most of these devices rely on a hook or loop which extends around the outside of the ear, suspending the attached speaker and radio circuitry at the opening of the ear canal. Without the hook, the radio falls from the ear with a slight jar. The challenge of placing the radio at the ear in a self-supported mode is further increased by the need to compete with the high quality sound generated in state of the art receivers. Such quality requires more filters, complex balancing circuits, enhanced amplifiers and similar refinements which add to the volume of space required and attendant weight.

Less expensive receivers have been developed with a lower quality and have maintained some stability when mounted at the ear canal. The present inventor has also produced an AM radio receiver which relied on a unique design for an oscillator as described in U.S. Pat. No. 4,539,708. This AM receiver has likewise enjoyed only minimal commercial success. This was due in part to limited sound quality and a mechanical tuning circuit that was somewhat awkward. More importantly, the structural shape of the radio was not optimal for maintaining stable contact at the ear opening. Generally, the design parameters applied to this receiver were limited to AM radios, and were not well suited for extensions into other types of receivers such as FM radio devices.

Another factor which has greatly limited the marketability of an ear mounted radio is cost. Typical consumers will only purchase such devices if the cost is minimal. Furthermore, a high cost ear receiver cannot compete with larger, more powerful systems which sell at the same price, even though they may not be mountable at the ear. For this reason, prior art attempts to place the receiver at the ear have been more of a novelty item than representative of a quality radio.

Such low cost and poor quality have created a market expectation that future ear mounted radios are likely to be of lower quality and should likewise be in a lower price range. In order to overcome this expectation, it is necessary to overcome the cost problem while enhancing the quality of sound. These seeming contradictory objectives of cost versus quality must be resolved within a very narrow range of physical limitations which meet the minimal size and weight requirements necessary to retain radio self supported when positioned at the ear.

OBJECTS AND SUMMARY OF THE INVENTION

It is an object of the present invention to provide an RF receiver which is sufficiently small to be positioned and retained in the ear opening of a user during normal use.

It is a further object of this invention to provide such a receiver which has a compact design and configuration which places the center of mass of the ear radio close to the ear canal opening to reduce the likelihood of being dislodged during use.

It is yet another object of the invention to provide a receiver that provides high quality sound reproduction, yet includes a casement configuration which is small enough to be mounted at the ear opening.

Yet another object of this invention is to provide a receiver which can be manufactured in small size and inexpensively, but which yields high quality sound reproduction.

These and other objects are realized in a radio frequency receiving device which is totally self contained and is fully supported within a diverging opening of a user's ear extending from the ear canal. The device includes an elongate casing having a lower half and an upper half and a total length of less than two inches. The front and back comprise a proximal face and an opposing distal face relative to the user's ear, each face having a width of less than three fourths of an inch. A surrounding perimeter wall including a bottom wall, a top wall and two opposing side walls completes the enclosure, each wall representing a thickness dimension for the device of less than one fourth of an inch. The proximal face includes a speaker device mounted to the casement which projects toward the user's ear canal. The speaker device is configured to frictionally position and stabilize the receiver device within the diverging ear opening. Functional operation of the device is provided by a printed circuit board contained within the casement, said board having interconnecting functional receiver circuits including a local oscillator, a mixer, a plurality of IF stages, a phase lock loop demodulator and a power source. Antenna means coupled to the oscillator provides RF reception. The device includes a battery compartment within the casement and associated wiring to couple the battery compartment to the circuit board. An on-off power and volume control switch is coupled within the casement to the printed circuit board and a tuning circuit selector switch is coupled to the printed circuit board for selecting a specific frequency for reception. All of these components are housed within the casement and have a collective weight of less than 2.5 ounces, thereby enabling the device to be suspended within the diverging ear opening without additional support applied with respect to outer surfaces of the ear or the user's head. A third point of frictional contact may also be applied between a top edge of the casement at the crown of the ear cartilage.

Additional objects and features of the present invention will be apparent to those skilled in the art, based on the following detailed description, taken in combination with the accompanying drawings, in which.

Figure 3:
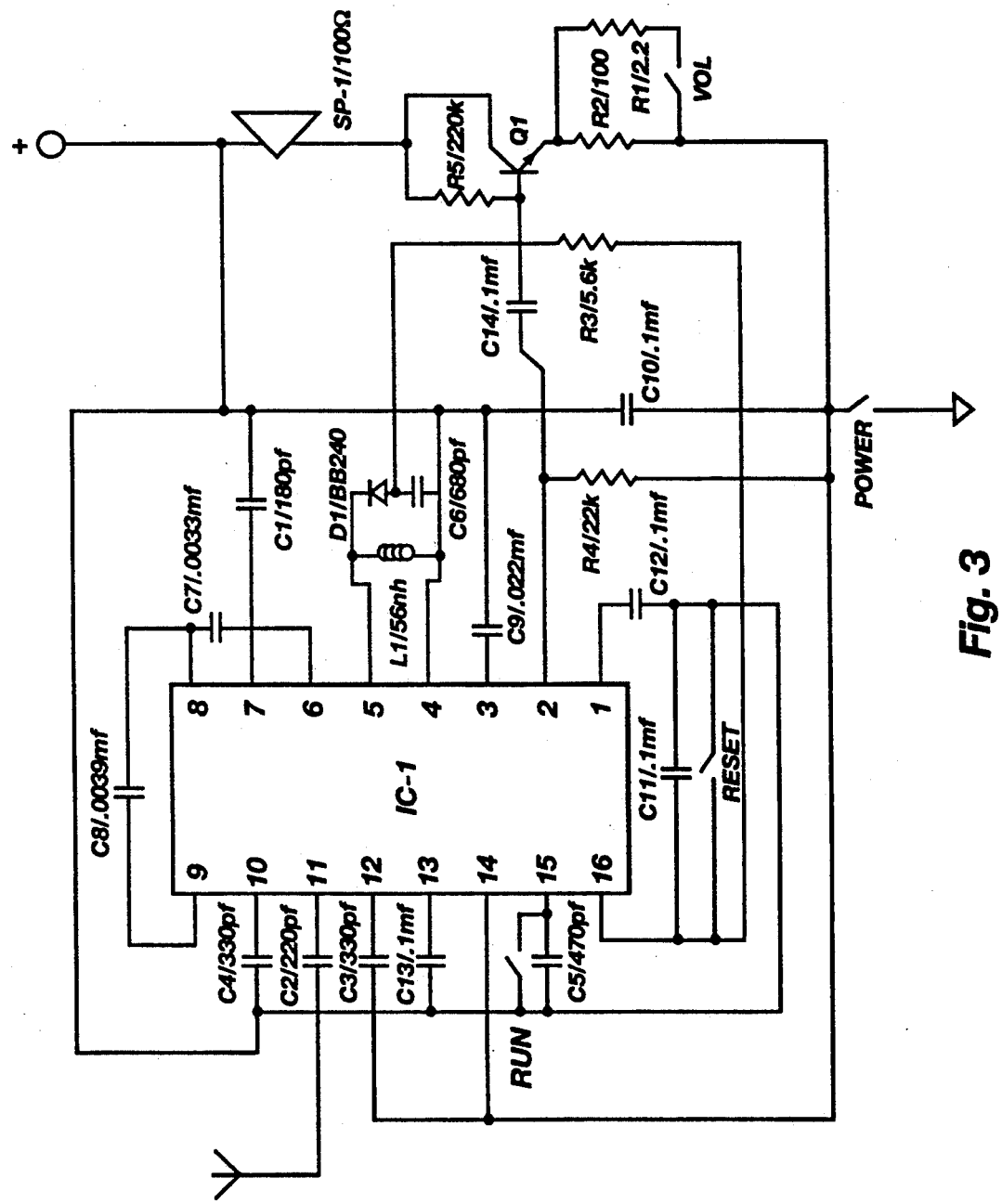

FIG. 3 provides a schematic diagram of representative circuitry for an FM radio receiver.

DETAILED DESCRIPTION OF THE INVENTION

Referring now to the drawings, the following description provides specific disclosure of a preferred embodiment of the present invention:

An FM receiver 10 is shown generally in its mounted position with respect to an individual's ear 11. This receiver is representative of any receiving device useful for reception of radio frequency signal within the audio range. Obviously, this would include AM and short wave transmissions as well as the illustrated FM band width.

This receiver 10 is totally self contained and is fully supported within a diverging opening 12 of the user's ear extending from the ear canal. This diverging opening refers particularly to that portion of ear cartilage which extends from the ear canal outward to form a wave guide cavity having a general concave structure 13 at the back part of the ear, and a forward lobe 14. These opposing sections of ear cartilage together provide forward and rearward tissue having sufficient stiffness to frictionally retain an object of appropriate size placed therebetween.

Figure 1:
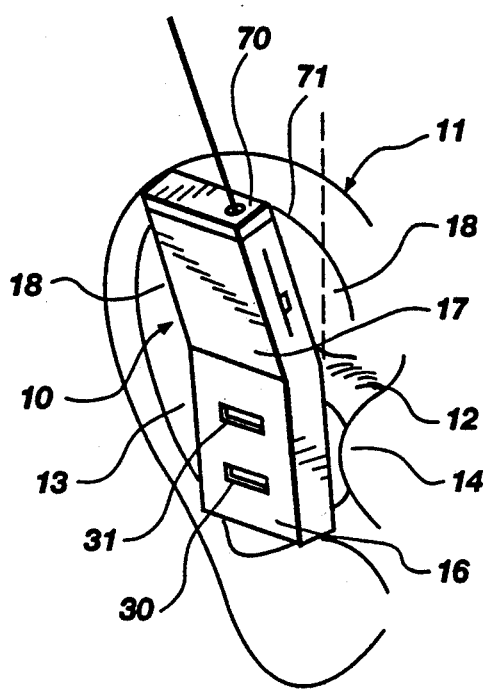
FIG. 1 shows a perspective view of the present invention positioned in the ear of a user.

The combination of this frictional support and a unique configuration for the receiver 10 enables the radio to maintain its seated position, despite significant movement on the part of the user. The receiver configuration is formed primarily by an elongate casing having a lower half 16 and an upper half 17, which is slightly angled outward as illustrated in FIG. 1. This angled configuration enables the lower portion 16 of the casing to rest in closest possible proximity to the ear, in a seated position within the diverging opening 12. This occurs because the angled upper half 17 extends away from the top cartilage 18, allowing the lower half 16 to fully nest against the ear canal. Except for this deflection of the upper half 17 from the plane 19 of the lower half, the upper ear cartilage 18 would block the casing from being positioned in this close position. As a consequence, the center of mass of the radio would be displaced from this preferred mounting location and the maximum frictional contact with the diverging opening of the ear would be frustrated.

The present inventor has discovered that the casement as configured in the figures provides enough space to contain the battery power supply, switching mechanisms for volume, power and tuning, as well as the associated circuitry required for high fidelity reproduction. For example, a representative circuit diagram is illustrated in FIG. 3. It is formed as part a printed circuit board 20 with an associated integrated chip 21 contained within a surrounding casement 22 and 23 which forms the casing for the radio 10. This board includes interconnecting, functional receiver circuits such as a local oscillator, a mixer, a plurality of IF stages, a phase lock loop demodulator and a power coupling.

This circuit board 20 is contained within the casement 22 and 23 in a folded configuration wherein part of the printed circuit is contained on a first folded section 25 of the board and functions as an on/off volume device. Separate wires connect from the board to speaker device 27 which is supported on casement 22. The remaining, second folded section 26 of the board provides contacts for activating and resetting the tuning circuit for selection of a desired FM signal.

Although other frequency selections systems may be applicable, the touch-tune system provides simplicity and convenience, as well as compactness in size. This touch operated switch is activated through an on/off circuit sandwiched between touch points 30 and 31 located at an exterior surface of the casement 23 and circuit contacts concealed on an opposing side of the second folded section 26 of the printed circuit board. Touch points 30 and 31 and tuning circuit contacts are aligned such that physical pressure applied to the touch points closes the tuning circuit selector switch, causing the selector to scan for the next frequency having adequate signal strength for reception. Such touch operates switches are well known generally, but have not been applied in this manner with an ear radio which is totally self contained and self supported.

By using this configuration and circuitry, it has been discovered, quite surprisingly, that receiver sensitivity as low as 4 microvolts are possible with excellent reproduction of sound. Typical good quality FM receivers require approximately 50 microvolt RF signal strength to lock on a channel during scanning operation. This sensitivity has been experimentally verified on a full circuit scanning range from 88 to 108 Khz which was applied to the present embodiment.

Reception is initiated by a conventional antenna means coupled to the oscillator for providing RF reception. For near area signals, the antenna may be housed within the casement 22. The present invention illustrates the use of a removable antenna 35 which can be attached to a port 36 on the casing exterior to extend or improve reception at greater distances.

A battery compartment 40 is housed within the casement and can be removed by sliding the compartment free from the upper half of the casing through opening 41. This compartment is shown with two battery insert slots 42 for providing a total of 3 volts dc power source to the circuitry. A top wall or cap 45 structurally closes the casement and provides mounting support to the antenna and battery compartment. Associated wiring (not shown) couples the battery compartment to the circuit board. This battery power source is wired in series through an on/off power and volume control switch 50 which is mounted to the casement exterior to provide touch access by the user.

A speaker device 27 is mounted to the casement at the lower half 16, approximately opposite to the touch points 30 and 31. This arrangement enables the user to apply a full contact force against the touch points without pushing the receiver into a less stable location. In fact, any perpendicular force applied to the touch points will tend to reinsert the speaker device 27 within the diverging opening 12, if some slippage has occurred. It is for this reason, in part, that the tuning switches, circuit board and speaker device have been aligned with the diverging ear opening 12, to ensure that the receiver remains balanced at the self supported position, even during manipulations of tuning and positional adjustment.

The speaker device comprises a generally circular speaker enclosure as is illustrated. Obviously, other configurations are plausible, provided the enclosure is configured to provide a snug fit within the diverging opening of the ear.

Although most of the components making up the functional circuitry are individually known to those skilled in the art, their association as part of a self-contained ear radio was not self evident. The general predisposition of the industry suggested against effective reduction of such circuitry to a small size in an economical manner because of inherent size and weight limitations. Accordingly, an important aspect of novelty of this invention is the combination of these components within a structural arrangement and configuration that makes the self-supported ear radio feasible, despite the contrary disposition within the art. The structural arrangement of the components has been set forth above. The configurational will now be considered.

As was mentioned, the casing is an important part of the feasibility of the receiver. It not only encloses the components in workable relationship, but provides the compactness and configuration to enable firm retention at the ear. This arises in part because of the flattened, elongate shape of the casement which permits its placement immediately at the ear canal of the user. The actual length of the casement may extend from one to two inches; however, optimal length is provided when the upper edge 70 of the casement contacts the inner lip 71 of the ear cartilage when the receiver is correctly seated at the diverging opening 12. This establishes triangular contact points at 13, 14 and 71, which greatly stabilizes the receiver because of frictional contact between the user's skin and the casement.

Figure 2:
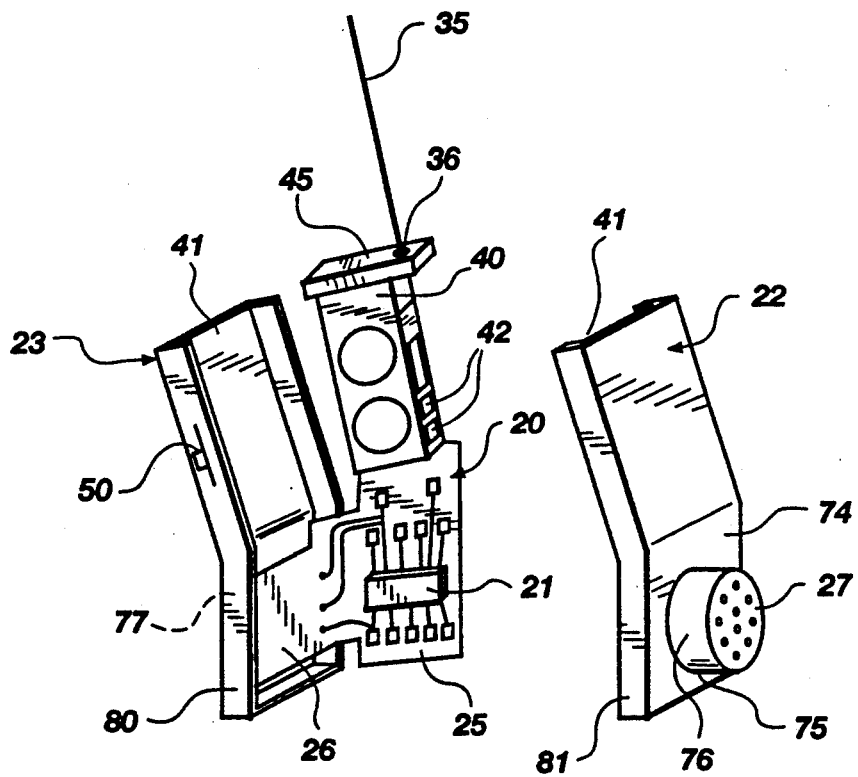
FIG. 2 illustrates an open, exploded view of the device shown in FIG. 1.

It is apparent that the relationship of the upper edge 70 with the ear lip 71 will be a function of the position of the speaker device 27. In the preferred embodiment, this speaker device is positioned at a lower, central portion of a proximal face 74 of the lower half of casing 22. In this configuration, most of the weight of the receiver is above the ear contacting surface at the lower edge 75 and periphery 76 of the speaker device. The opposing distal face 77 (concealed in FIG. 2) includes the touch points 30 and 31 as discussed above.

These proximal and distal faces, relative to the user's ear, have a width of less than three fourths of an inch, and are attached to a surrounding perimeter wall 80 and 81, comprising a bottom wall, a top wall and two opposing side walls, each wall having a combined thickness of less than one fourth of an inch. Actual dimensions of the device illustrated in the figures are a uniform combined wall thickness of 3/16ths of an inch, with each face being ½ inch in width. The total length of the receiver is 1 and ½ inches, with the upper half being approximately ⅜ths of an inch in length, and the lower half being approximately ⅝ths of an inch. It will be apparent that the designations of upper and lower halves are intended to be general approximation, and not a mathematical statement of relative comparison.

It is important to note that the casing and all components within the casement have a collective weight of less than 2.5 ounces, and preferably 1.5 oz., thereby enabling the device to be suspended within the diverging ear opening without additional support applied with respect to outer surfaces of the ear or the user's head.

The extent of divergence of the upper half of the casement from the plane of the lower half of the casement is represented by angle 90. It will be apparent that variations in anatomy will favor differing angles, depending upon the extent to which the top ear cartilage is displaced from the user's skull. Generally this displacement will be within the range of 10-30 degrees, with a preferred value of approximately 20 degrees deflection.

I claim:

1. A radio frequency receiving device which is totally self contained and is fully supported at a diverging opening of a user's ear extending from the ear canal, said device comprising:

an elongate casement having a lower portion and an upper portion and a total length of less than two inches, a proximal face and an opposing distal face relative to the user's ear, each face having a width of less than three fourths of an inch, and a surrounding perimeter wall including a bottom wall, a top wall and two opposing side walls, each wall having a thickness of less than three eighths of an inch, wherein said casement is configured with slight deflection of the upper portion away from a plane containing the lower portion, said deflection being away from the user to allow space for an upper ear lobe to rest against the casement without pushing against the casement when inserted at the diverging ear opening;

said proximal face including a speaker device mounted to the lower portion of the casement and projecting toward the user's ear canal, said speaker device being configured to frictionally position and stabilize the receiver device within the diverging ear opening;

a printed circuit board contained within the casement, said board having interconnecting functional receiver circuits including a local oscillator, a mixer, a plurality of IF stages, a tuning circuit and a power source;

antenna means coupled to the oscillator for providing RF reception;

a battery compartment within the casement and associated wiring to couple the battery compartment to the circuit board;

an on/off power and volume control switch coupled within the casement to the printed circuit board; and a tuning circuit selector switch coupled to the printed circuit board for selecting a specific frequency for reception;

all of said components being housed within the casement and having a collective weight of less than 2.5 ounces, thereby enabling the device to be suspended at the diverging ear opening without additional support applied with respect to outer surfaces of the ear or the user's head.

2. A device as defined in claim 1, wherein the casement has a rectangular configuration wherein the casement length is at least twice as long as the casement width.

3. A device as defined in claim 1, wherein the speaker device comprises a generally circular speaker enclosure with a perforated face for transmitting sound therethrough, said enclosure being configured to provide a snug fit within the diverging opening of the ear.

4. A device as defined in claim 1, wherein the tuning circuit switch comprises a touch activated scanning circuit which is contained within the casement and includes at least one touch point at an exposed surface of the casement to initiate a scanning sequence for automatically selecting the next sequential frequency having an adequate signal strength.

5. A device as defined in claim 4, wherein the touch point is located on the distal face of the casement and at approximately the same height along the casement as is the speaker device.

6. A device as defined in claim 4, further comprising a reset touch point and associated circuitry for commencing a new scan with respect to frequency reception.

7. A device as defined in claim 1, wherein the battery compartment is located in the upper portion of the casement, said casement including a door release to permit access to the battery compartment.

8. A device as defined in claim 7, wherein the battery compartment includes two receptacles configured to receive two respective batteries, said battery compartment being dimensioned to slide within an upper end of the casement, said compartment having an end plate which fits over the top end of the casement when the battery case is fully inserted.

9. A device as defined in claim 8, wherein the antenna is mounted through the end plate attached to the battery compartment, and includes means for extending the length of the antenna for enhancing reception at greater distances.

10. A device as defined in claim 1, wherein the length of the elongate casement is approximately 1 and ½ inches, the width of the respective proximal and distal faces is approximately ½ inch and the wall thickness is approximately ¼ inch.

11. A device as defined in claim 1, wherein the speaker device is mounted on the bottom portion of the casement, and the deflection of the upper casement portion is within the range of 10 to 30 degrees from the plane of the bottom portion.

12. A device defined in claim 11, wherein the deflection of the upper casement portion is approximately 20 degrees from the plane of the bottom portion.

13. A device as defined in claim 1, wherein the total weight of the device is approximately 1.5 oz.

14. A device as defined in claim 1, wherein the casement configuration has a length such that a top edge thereof makes frictional contact with an extending lip of proximate ear cartilage at a top portion of the user's ear.

15. A radio frequency receiving device which is totally self contained and is fully supportable within a diverging opening of a user's ear extending from the ear canal, said device comprising:
   an elongate casement comprising a top portion and a bottom portion, the top portion being deflected from the bottom portion by an acute angle whose value is between 10 and 30 degrees;
   said casement having a proximal face to be positioned next to the ear of the user and a distal face for opposing positioning away from the ear of the user;
   said proximal face including a speaker device mounted to the casement at the lower portion and projecting toward the user's ear canal, said speaker device being configured to frictionally position and stabilize the receiver device at the diverging ear opening such that at least three frictional contact points approximately within the same plane are established between the casement and user's ear;
   a printed circuit board contained within the casement, said board having interconnecting functional receiver circuits including a local oscillator, a mixer, a plurality of IF stages, a tuning circuit and a power source;
   antenna means coupled to the oscillator for providing RF reception;
   a battery compartment within the casement and associated wiring to couple the battery compartment to the circuit board;
   an on/off power and volume control switch coupled within the casement to the printed circuit board; and
   a tuning circuit selector switch coupled to the printed circuit board for selecting a specific frequency for reception;
   all of said components being housed within the casement and having a collective weight of less than 2.5 ounces, thereby enabling the device to be suspended within the diverging ear opening without additional support applied with respect to outer surfaces of the ear or the user's head.

16. A device as defined in claim 15, wherein the total weight of the device is approximately 1.5 oz.

17. A device as defined in claim 16, wherein the value of the acute angle of deflection is approximately 20 degrees.

18. A device as defined in claim 15, wherein the casement configuration has a length such that a top edge thereof makes frictional contact with an extending lip of proximate ear cartilage at a top portion of the user's ear.

* * * * *